Figure 1:
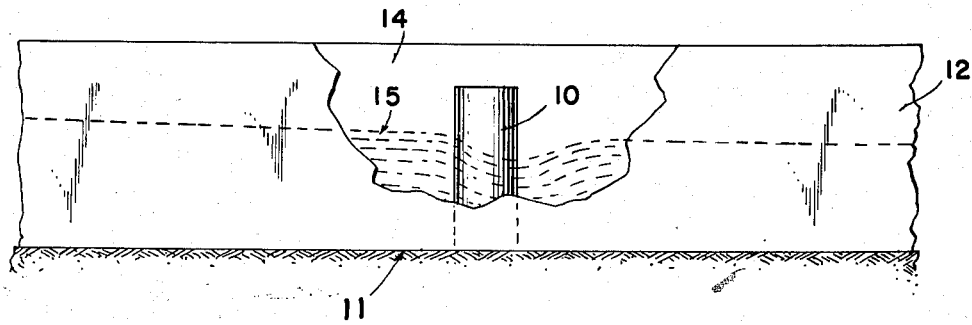

Feb. 7, 1956   L. B. GRIFFITH   2,733,816
SELECTIVE SOLIDS REMOVAL
Filed Aug. 4, 1954

INVENTOR.
LLEWELLYN B. GRIFFITH
BY Henry H. Snelling
ATTORNEY

United States Patent Office 2,733,816
Patented Feb. 7, 1956

2,733,816

SELECTIVE SOLIDS REMOVAL

Llewellyn B. Griffith, Arlington, Va.

Application August 4, 1954, Serial No. 447,806

6 Claims. (Cl. 210—172)

This invention relates to the screening of sewage channels and has for its principal object the provision of a device which automatically retains certain solids from the liquid while permitting other types of solids to remain in the flowing sewage.

A further object of the invention is to provide a channel having therein a central pier roughtly 6" in diameter and an abutment on each side of the channel to form on the sides of the pier two equal paths of a width equal to the radius of the pier whereby to pass a rag or similar solid elongated object of less length than twice the diameter of a pier while holding solid objects whose lengths exceed that stated.

The invention is particularly suited to the removal of solids in connection with treatment plants for domestic sewage or for other various types of wastes. In this restricted field practically all present treatment plants make use of a conventional bar rack to remove coarse solids from the waste so as to prevent clogging of pipes, failure of pumps, or of other mechanical devices which are necessary parts in practically all such sewage treatment plants. Such bar racks are usually made of metal bars of ¼" strap iron set on edge with a space between them of from 1½" to 2½" and set across the waste influent channel at a chosen slope of from 30° to 90°. These bar screens not only collect the objectionable large rags which should be removed but they also stop great quantities of string, hair, bits of paper, etc., which must be removed several times daily to prevent the channel from overflowing. Such cleaning is by hand or by elaborate and costly bar screen cleaning apparatus. In either case there is a serious problem of disposal of these large quantities of organic matter to prevent excessive odor and attracting flies.

In some plants comminutors are used to grind up the withdrawn solids but these are relatively costly to install and maintain and they grind the sewage solids into fine particles that do not settle out by gravity and must therefore be treated by most costly secondary biochemical methods. Generally the only solids which need to be removed are those which cannot readily pass a 4" air lift pipe, for example rocks of more than 3" in diameter and similar objects which are infrequent and together constitute less than 10% of the solids which are removed on conventional bar racks.

In accordance with the present invention, an apparatus useful in attaining the desired result is provided wherein, for example, by employment of a simple control pier, one may remove from the fluid solids of harmful length and size without also having to dispose of about ten times that amount of solids which it would be best not to remove. This is accomplished through the discovery of a simple mathematical relationship between the velocity of flow and the effective width as reduced by solids of various lengths.

Figure 2:
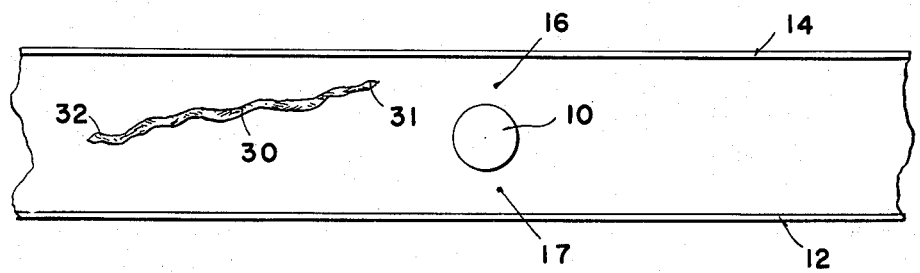
Figure 3:
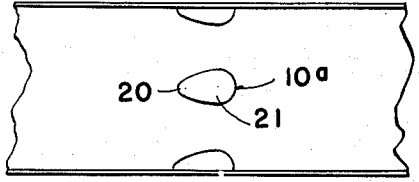

In the drawings:
Figure 1 is a side elevation;
Figure 2 is a plan view;
Figure 3 is a plan view of a channel of somewhat greater width but taken on a smaller scale.

In Figures 1 and 2 is shown a specific example of a sewage flow channel 12" wide and 18" deep with a single hydraulic restriction 10 placed in the center of the channel. The bottom of the channel is 11, the parallel sides are 12 and 14, and the liquid surface level is denoted by the numeral 15. In a channel of this width the fluid is shown as pasing through two 3" wide paths 16 and 17, separated by a single pier on the center line. While this pier 10 is here shown as circular in horizontal section certain more complex curved cross-sections may be used to better advantage in special cases, for example, the pier 10a in Fig. 3 has a fairly sharp rounded upstream point 20 and is widest at a point such as 21, farther down-stream than the center of this pier. While not preferred, the pier could be a hollow tube of metal having a rather blunt up-stream curve and a streamlined down-stream portion.

It will be seen that the sewage flow normally is equal through the two restricted paths 16 and 17 which are similar and consequently the velocity in each is the same and is considerably greater than the velocity up-stream. Should a small solid in the sewage reach the location of the cylindrical pier 10, it will pass through the nearest of the two restricted channels and there will be no appreciable effect on the water depth velocity head or on the total energy head because there will be no change in velocity between the liquid particles and the solids which are all moving uniformly at the same rate.

The surface of the pier 10 is relatively smooth and solids of this type will readily be deflected into one or the other of the two channels. A different effect entirely obtains, however, should a long rag be floating in the liquid. Such a rag is denoted by the numeral 30, having a front end 31 and a rear end 32, the length of this rag being in excess of 12". If the rag is in the channel crosswise, each end 31 and 32 will enter a separate restriction and it will be held in the center by the pier by friction force, increasing as the flow and velocities of the liquid increase through both channels 16 and 17.

Naturally a much more common happening would be that the long rag is roughly parallel to the lines of flow as it approaches the pier. In such a case the front end 31 will be deflected into restricted passageway 16. Due to the length of the rag 30 the end 31 of this rag will be in liquid flowing at a greatly increased velocity while toward the end 32 of this rag the greater portion of the rag will be traveling at the slower rate of the liquid upstream of the pier 10 which is an obstruction. The only way the rag may increase its velocity is from some external force but the frictional force in the restriction is less than the retarding frictional force of the longer portion in the up-stream portion, consequently the rag produces an added loss of head in the restricted channel 16 and this, in turn, reduces the velocity head and the flow is decreased causing the up-stream current to move relatively faster toward the open restriction 17 and carry the end 32 with it. Therefore the two ends 31 and 32 of the long rag on opposite sides of the pier 10 are pulled in opposite sides of the post and bind the rag tightly against the up-stream surface of the pier, with the two ends 32 trailing slightly down-stream. Any rag of length greater than twice the diameter of the pier would be caught in this manner but where the rag is shorter than twice the diameter, it would be pulled free and would pass the pier with the sewage.

In Figure 3 the channel is 16" wide. In this case a single pier would be unsatisfactory as it is desired to keep the maximum width of the restricted passages to a maximum of 3". Consequently an abutment such as 34 is placed on either side of the central pier 10a each having a width of 2". The abutments in all cases preferably follow the pattern of the pier up to 3" wide. Should a wider abutment than 3" be required the length of the abutment might well be increased.

What I claim is:

1. In a sewage treating system in which the sewage in liquid form carrying various types of solids flows through a sewage channel having parallel sides, means for removing objects of greater length than 12" while passing rags and similar objects of lengths shorter than 12", said means including a single pier having an up-stream curved face, a transverse width of approximately 6", and a distance from its up-stream point to its greatest width of less than 6", the width of the two sewage paths, one on each side of the pier, being equal and not exceeding 3", all sewage in the channel passing through said two paths and below the top of the pier.

2. The combination of claim 1 in which the pier is circular in horizontal cross-section with a diameter of 6".

3. Sewage apparatus including a channel through which sewage flows and flow dividing means in the channel, said means comprising a vertical pier rising from the bottom of the channel to a point above the liquid level of the flowing sewage, dividing the flow into two equal paths not exceeding 4" wide, the pier having a width of not less than 5", a length parallel to the sides of the channel at least 6", and said pier being located in a section of the channel having parallel sides.

4. The method of removing objects of greater length than a chosen figure from sewage flowing in a sewage channel while passing rags and similar objects of lengths shorter than such chosen figure which includes obstructing the channel to divide the channel into two equal paths on opposite sides of the centerline of the channel, each of a transverse width of not exceeding 4", the width of the obstructed portion of the channel between the paths being at least 5".

5. A sewage treating system in which the sewage in liquid form carrying various types of solids flows through a sewage channel having parallel sides, means for removing objects of a designated length while passing rags and similar objects shorter than such designated length, in which the channel is divided into two equal velocity side paths by a central pier of at least 5" in width and by abutments extending from the two sides of the channel toward the pier, reducing the width of the side paths to less than 3".

6. In a sewage treating system in which the sewage in liquid form carrying various types of solids flows through a sewage channel having parallel sides, means for removing objects of greater length than a designated length while passing rags and similar objects of lengths shorter than such designated length, said means including a single pier having an up-stream curved face, a transverse width of about half said designated length, and a distance from its up-stream point to its greatest width of less than its transverse width, said pier extending from the bottom of the channel to a point above the liquid level in the channel and dividing all the flowing sewage into two rapidly moving paths, one on each side of the pier, said paths being of equal width, such width being less than the transverse width of the pier.

References Cited in the file of this patent
UNITED STATES PATENTS

| 317,366 | Jaeger | May 5, 1885 |
| 1,324,082 | Strange | Dec. 9, 1919 |